United States Patent [19]

Kimura

[11] 4,449,789
[45] May 22, 1984

[54] VACUUM TIGHT WINDOW THROUGH WHICH A HIGH POWER LASER BEAM AND A HIGH ENERGY PARTICLE BEAM CAN BE TRANSMITTED WITHIN CLOSE PROXIMITY TO EACH OTHER

[75] Inventor: Wayne D. Kimura, Seattle, Wash.

[73] Assignee: The United States of America as represented by the Secretary of the Navy, Washington, D.C.

[21] Appl. No.: 416,526

[22] Filed: Sep. 9, 1982

[51] Int. Cl.³ .............................................. G02B 27/00
[52] U.S. Cl. .................................................... 350/319
[58] Field of Search .......................... 350/319, 320, 317

[56] References Cited

U.S. PATENT DOCUMENTS 4,109,218  8/1978  Schneider et al. ................. 372/28 X
4,389,593  6/1983  DeSantis et al. ......................... 315/4

Primary Examiner—John K. Corbin
Assistant Examiner—Lynn Vandenburgh
Attorney, Agent, or Firm—R. F. Beers; C. D. B. Curry; G. L. Craig

[57] ABSTRACT

An apparatus and method by which a high-power laser beam and a high-energy particle beam may enter or exit a region, typically filled with gas, to or from another region, typically under vacuum. The two beams are spaced about 3–4 mm apart center-to-center at the entry/exit point and no gas is permitted to leak into the vacuum region. A disc of material capable of resisting high radiation fluxes without forming color centers is sealed into a metallic holding block. Prior to sealing of the disc, a hole approximately 0.16 cm is drilled into the disc while the disc is tilted at or above Brewster's angle forming an elliptical hole. A thin film, approximately 6000 Å, indium metallization is sputtered in a circular pattern about the hole and around the edges of a beryllium disc. An indium disc is then sandwiched between the disc with the hole and the beryllium disc touching the indium metallization on each piece.

9 Claims, 4 Drawing Figures

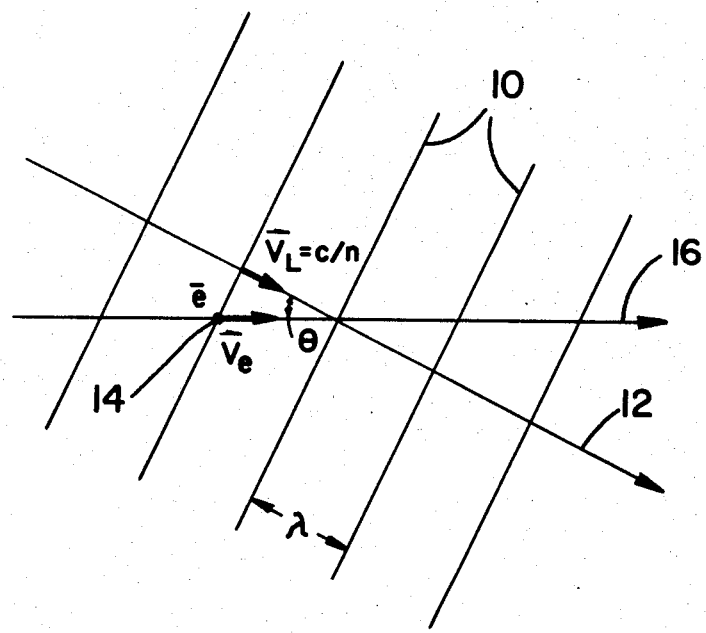
FIG_1
(PRIOR ART)
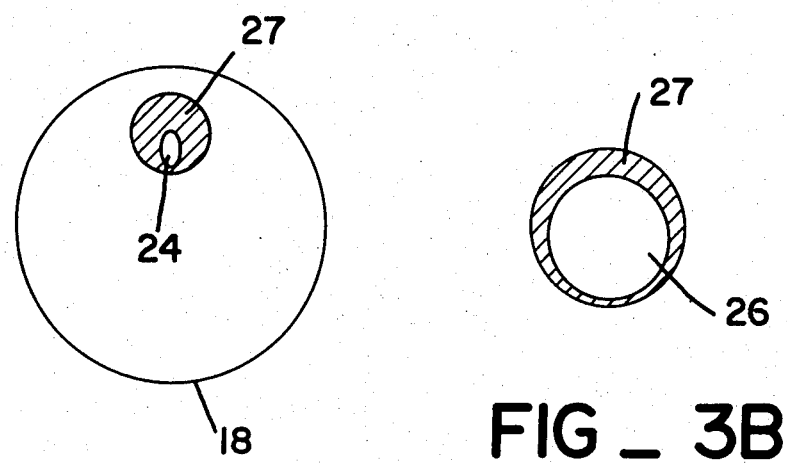
FIG_3A  FIG_3B

VACUUM TIGHT WINDOW THROUGH WHICH A HIGH POWER LASER BEAM AND A HIGH ENERGY PARTICLE BEAM CAN BE TRANSMITTED WITHIN CLOSE PROXIMITY TO EACH OTHER

BACKGROUND OF THE INVENTION

1. Field of the Invention

The present invention relates to design of a window permitting a high-power laser beam and a high-energy particle beam to enter or exit a region filled with gas from or to a vacuum region with the two beams in close proximity to one another while not permitting gas leakage into the vacuum region. The invention further relates to a window for a gas cell having high optical quality such that it permits transmission of a laser beam with minimal losses as well as particle beam transmission with minimum scattering and loss of beam current and is yet highly resistant to degradation by either the laser beam or particle beam.

2. Description of Prior Art

Energy or momentum exchange between free electrons and photons, such as that achieved in the free electron laser (FEL) requires, among others, phase-matching of the particles with the electromagnetic field in which energy and momentum are conserved. One method to achieve momentum exchange is the inverse Cerenkov effect, wherein a gaseous medium retards the phase velocity of the electromagnetic wave. This is depicted as prior art in FIG. 1, in which the phase velocity of a laser light wave 10 along one direction 12 in the medium is $v_1 = c/n$, where c is the velocity of light in vacuum and n is the index of refraction of the medium. An electron 14 traveling with velocity $v_e$ in another direction 16 intersects the laser beam 10 at an angle $\theta$. To insure that the electron 14 remains in a field of constant phase, the phase velocity of the laser in the direction of the electron's velocity, $v_1/\cos\theta = c/n\cos\theta$, must equal the velocity of the electron 14, $\beta c$, where $\beta = v_e/c$. This is satisfied when $$\theta = \cos^{-1}(1/\eta\beta)$$

and is referred to as the Cerenkov angle, $\theta_c$. The electron and interacting photon must further obey the energy conservation relation, $$E_f - E_i = \hbar\omega$$

where $E_i$ and $E_f$ are the initial and final electron energies respectively, and $\omega$ is the photon energy ($\omega$ is the laser frequency); and the momentum conservation relation $$p_f - p_i = \hbar k$$

where $p_i$ and $p_f$ are the initial and final electron momenta respectively, and k is the laser wavevector, given by $|k| = \omega n/c$, intersecting $p_i$ at an angle $\theta$. Thus for photon energies much less than the electron energy we find $$E_f - E_i \approx \beta c(p_f - p_i) \approx \hbar\omega_n\beta\cos\theta$$

illustrating satisfaction of both energy and momentum conservation conditions.

The net effect of this inverse Cerenkov interaction between the electrons 14 and the electric field of the laser 10 is momentum, energy, and velocity modulation of the electron beam. The energy exchange can be much greater than the random energy spread of the electron beam. By allowing the electrons to drift, the velocity modulation of the electrons 14 is transformed into a density modulation, creating electron bunches separated by the laser wavelength. Coherent optical radiation can be extracted from the bunched beam, thus creating in a manner analogous to microwave devices an optical klystron or optical traveling wave tube. This coherent radiation from the bunched beam will contain light at the higher harmonics of the laser frequency, hence harmonic generation is feasible, possibly extending up to the ultraviolet region. Another application is in the area of laser-driven particle accelerators in which multiple passes of the electron through the laser field can be used to accelerate a portion of the electrons to high energies. The very high electric fields obtainable from lasers means large acceleration gradients ($\simeq 10^2 - 10^3$ MeV/m) are possible.

The advantage of using electron accelerator systems as sources of coherent optical radiation is due to the high powers and energies per pulse such systems are capable of providing at relatively high efficiencies. For the optical klystron, just as in the microwave klystron amplifier, the lack of a direct feedback path between the input and output signals enables high power gains, whereas in quantum amplifiers this is limited because of the onset of spurious oscillations. An additional advantage of electron beam devices is that free electrons can emit over and be coupled to a wide and continuous electromagnetic spectrum.

However, most approaches utilizing energy exchange between photons and relativistic electrons are conducted entirely in a vacuum. This frequently results in highly complex and expensive equipment. The advantage of intermixing of the two beams as described above using the inverse Cerenkov interaction has been recognized theoretically for some time but lack of appropriate equipment has prevented exploration of the technique. The instant invention permits fabrication of a gas cell having windows for ingress/egress of the two beams in a manner permitting effective use of the technique.

SUMMARY OF THE INVENTION

Briefly described is a gas cell window permitting a high-power laser beam and a high-energy particle beam to enter or exit the gas-filled cell to or from a vacuum region and in which the two beams are spaced about 3-4 mm apart at the entry/exit point while no gas leakage occurs into the vacuum region. A disc of material capable of withstanding high radiation fluxes without degradation and yet having high optical quality such as to permit efficient transmission of the beams is sealed into a metallic holding block. Prior to sealing of the disc, a hole approximately 0.16 cm is drilled into the disc while the disc is tilted at or above Brewster's angle forming an elliptical hole. A thin film, approximately 6000 Å, indium metallization is sputtered in a circular pattern about the hole and around the edges of a beryllium disc. An indium disc is then sandwiched between the disc with the hole and the beryllium disc touching the indium metallization on each piece.

A primary object of invention is a window for a gas cell permitting a high-power laser beam and a high-intensity particle beam to enter/exit the cell while they are within 3-4 mm center-to-center and to mutually interact without degradation of either beam and without gas leakage from the cell.

BRIEF DESCRIPTION OF THE DRAWINGS

FIG. 1 schematically illustrates the inverse Cerenkov interaction known in prior art.

FIGS. 3A, 3B shows the location of the indium metallization with respect to the quartz and beryllium discs.

DESCRIPTION OF THE PREFERRED EMBODIMENT

Figure 2:
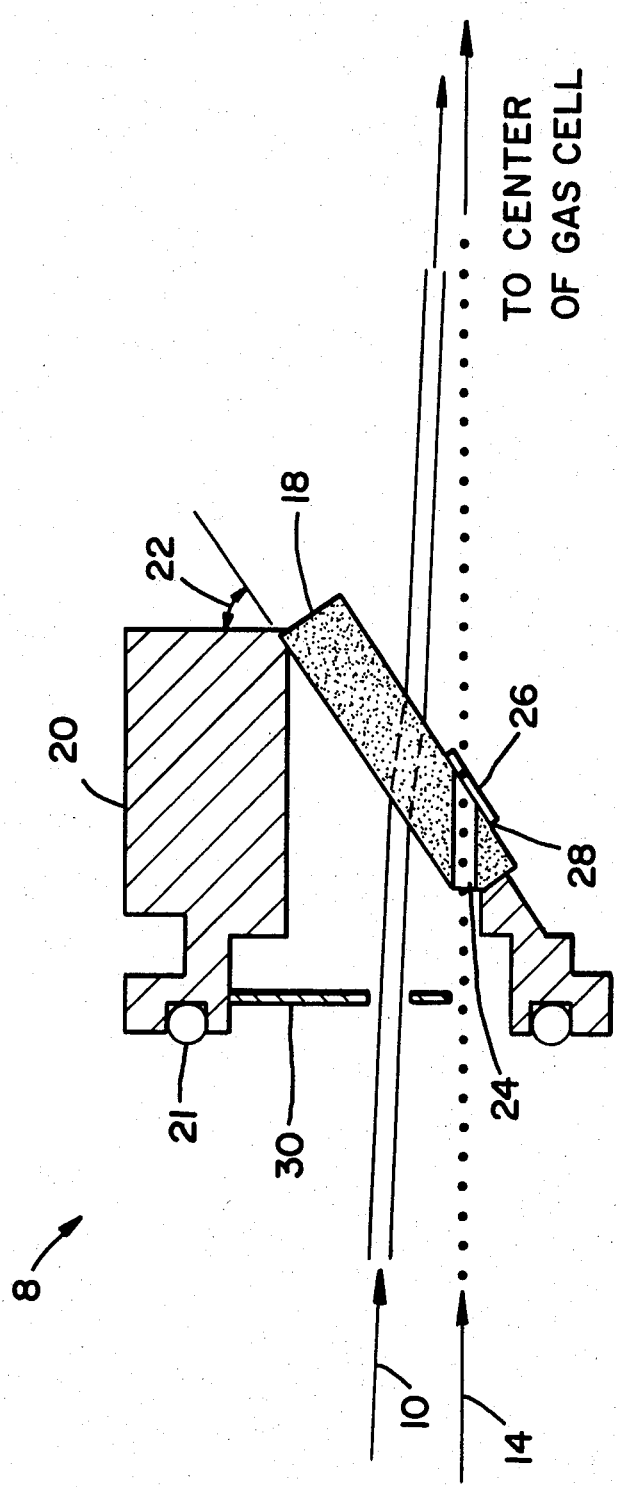
FIG. 2 is a cross-section view of the invention showing entry of the two-beams into the gas cell.

As previously stated, the crucial elements for interaction between a high-power laser beam and a high-energy particle beam in a gas-filled interaction region, are the windows for entry/exit of the beams. They must be of high optical quality, especially on the surfaces, to permit the laser beam to travel through them without damage to the windows and with minimal losses. The windows must allow the electron beam to travel through it with a minimum amount of scattering and loss of beam current. Due to the very high radiation fluxes produced by the particle beam, the window must be radiation resistant and, for health safety, should have a relatively short radioactive half-life after suffering beam activation. The windows must be easily aligned into the laser and particle beam transport systems and must be able to withstand a pressure differential of at least two atmospheres without leakage into the vacuum region.

Referring to FIG. 2, a cross-sectional view of the preferred embodiment of the assembled window 8 is shown including positions of the laser beam 10 and particle beam 14. A one-inch diameter by one-quarter inch thick very high purity synthetic quartz disc 18 is sealed into an aluminum block holder 20 using a high vacuum wax. The quartz disc 18 is tilted at Brewster's angle 22 with respect to the laser beam 10 (for visible and near-infrared wavelengths, this is approximately 57°) to permit maximum transmission of the laser light and to decrease the laser power density at the surfaces. The window 8 is positioned and sealed inside the gas cell, not shown, using an O-ring 21. A 0.025 mm thick, vacuum-tight beryllium disc 26 is then sealed over the elliptical hole 24 using an indium gasket 28. To protect the indium metallization around the hole 24 and the disc 28, a laser shield 30 is positioned as shown inside the mounting block 20.

Referring to FIGS. 3A, 3B an indium metallization 27 is sputtered in a thin film (about 6000 Å) in a ¼ inch circular area about the elliptical hole 24 in the quartz disc 18 and around the edges of the beryllium disc 26 prior to sealing of the hole 24 with the indium disc 28 of FIG. 2.

The manufacture of the window 8 of the present invention has several critical steps described as follows. An ultrasonic drill is used to make a 1/16 inch diameter hole 24 in the quartz disc 18 while the disc is tilted at Brewster's angle. The disc 18 is then given a laser-quality polish on both surfaces, with the faces kept parallel to within 20 seconds of arc. The disc 18 is then immersed in a 90° C. nitric acid/water solution (50:50) for three hours to remove any impurities on the surfaces. The disc 18 is then immersed in a 90° C. water bath for two hours as a final rinse. The disc 18 is then waxed into the holder block 20. A thin film (approx. 6000 Å) of indium is sputtered on the surface of the quartz disc 18 in a ¼ inch circular pattern 27 around the elliptical hole 24 and about the edges of a ¼ inch diameter by 0.001 inch thick beryllium disc 26. An indium disc 28, cleaned with acid and ethanol to remove any indium oxide, is sandwiched between the quartz disc 18 and the beryllium disc 26 touching the indium metallization on each piece. The beryllium disc 26 is then clamped to the quartz disc 18 using a spring-loaded press and the whole unit heated to 160° C. in an evacuated oven to allow the indium to melt without oxidizing, thus creating a vacuum-tight seal. A laser shield 30 is then positioned inside the mounting block 20 to protect the indium from laser damage and the window 8 then positioned and sealed inside the gas cell, not shown, using O-rings.

In alternative embodiments, to decrease the laser power density on the surfaces of the quartz disc and thereby increase the amount of laser power that can be transmitted, the quartz disc can be tilted at an angle greater than Brewster's angle. Additionally, for transmission of laser beams at far infrared wavelengths (e.g. 10 μm), the quartz disc may be replaced by discs of KCL, NaCL, ZnS or ZnSe. As radiation darkening of these materials may sometimes be disadvantageous, thin discs of germanium and silicon may also be used.

What is claimed is:

1. A vacuum-tight window for installation in a gas cell through which a high-power laser beam and a high-energy particle beam can be transmitted within close proximity to each other comprising:
    (a) a cylindrical holding block having a central bore along its longitudinal axis aligned parallel to the longitudinal axis of said gas cell, said holding block positioned and sealed within said gas cell by at least one O-ring;
    (b) a disc of a first material capable of transmitting laser beams and having a drilled hole near its perimeter at a predetermined angle to the surface of said disc, said disc of said first material positioned within said central bore of said holding block such that said disc of said first material completely spans said central bore and such that the longitudinal axis of said drilled hole is parallel to said longitudinal axis of said central bore;
    (c) a circular film of a second material about said drilled hole on said disc of said first material on its surface internal to said gas cell;
    (d) a disc of said second material bonded over said drilled hole and within said circular film pattern; and
    (e) a disc of a third material bonded to said disc of said second material and to said circular film of said second material, said disc of said third material having a thin film of said second material about its rim completely touching said circular film on said disc of said first material.

2. The window of claim 1 wherein said disc of said first material may be chosen from the class of discs made of quartz, potassium chloride, sodium chloride, zinc sulfide, zinc selenide, germanium or silicon.

3. The window of claim 1 wherein said second material is indium.

4. The window of claim 1 wherein said third material is beryllium.

5. A method of forming a vacuum-tight window for installation in a gas cell through which a high-power laser beam and a high-energy particle beam can be transmitted within close proximity to each other comprising the steps of:
- (a) obtaining a cylindrical holding block having a central bore for retaining a disc of a first material capable of transmitting laser beams;
- (b) drilling a hole through said disc of said first material at a predetermined angle such that when said disc of said first material is held within said holding block the longitudinal axes of said drilled hole and said central bore are parallel;
- (c) polishing both surfaces of said disc of said first material while keeping the faces of said disc of said first material parallel to within 20 seconds of arc;
- (d) immersing said disc of said first material in a 50 percent solution 90° C. nitric acid/water both for three hours;
- (e) rinsing said disc of said first material in a 90° C. water both for two hours;
- (f) waxing said disc of said first material into said holder;
- (g) sputtering a thin film of a second material in a thin circular film about said drilled hole and about the perimeter of a disc of a third material;
- (h) placing a gasket of said second material over said drilled hole and within said thin circular film;
- (i) clamping said disc of said third material over said gasket to said disc of said first material such that said thin film on said disc of said first material and said third material touch; and
- (j) heating said window so formed in an evacuated oven at 160° C. such that said second material melts without oxidizing to form said vacuum-tight seal.

6. The window of claim 5 wherein said disc of said first material may be chosen from the class of discs made from quartz, potassium chloride, sodium chloride, zinc sulfide, zinc selenide, germanium or silicon.

7. The window of claim 5 wherein said second material is indium.

8. The window of claim 5 wherein said thin film is approximately 6000 Å thick.

9. The window of claim 5 wherein said third material is beryllium.

* * * * *